(12) United States Patent
Plamthottam

(10) Patent No.: US 11,781,006 B2
(45) Date of Patent: Oct. 10, 2023

(54) GEL SPUN FIBERS AND METHOD OF MAKING

(71) Applicant: Sebastian S. Plamthottam, Upland, CA (US)

(72) Inventor: Sebastian S. Plamthottam, Upland, CA (US)

( * ) Notice: Subject to any disclaimer, the term of this patent is extended or adjusted under 35 U.S.C. 154(b) by 336 days.

(21) Appl. No.: 16/962,031

(22) PCT Filed: Jan. 18, 2019

(86) PCT No.: PCT/US2019/014139
§ 371 (c)(1),
(2) Date: Jul. 14, 2020

(87) PCT Pub. No.: WO2019/143899
PCT Pub. Date: Jul. 25, 2019

(65) Prior Publication Data
US 2020/0399460 A1 Dec. 24, 2020

Related U.S. Application Data

(60) Provisional application No. 62/619,879, filed on Jan. 21, 2018.

(51) Int. Cl.
*C08L 53/02* (2006.01)
*D01D 5/06* (2006.01)
*D01F 6/04* (2006.01)

(52) U.S. Cl.
CPC .............. *C08L 53/02* (2013.01); *D01D 5/06* (2013.01); *D01F 6/04* (2013.01); *C08L 2203/12* (2013.01); *D10B 2321/0211* (2013.01)

(58) Field of Classification Search
CPC ....... C08L 53/02; C08L 2203/12; D01D 5/06; D01F 6/04; D10B 2321/0211

USPC .......................................................... 524/505
See application file for complete search history.

(56) References Cited

U.S. PATENT DOCUMENTS

2003/0207639 A1  11/2003  Lin
2018/0187336 A1*  7/2018  Lhost ....................... D01D 1/02

FOREIGN PATENT DOCUMENTS

CN        103144383 A  *  6/2013
JP        2003082528        3/2003
JP        2007314904        12/2007

OTHER PUBLICATIONS

Patent Cooperation Treaty (PCT), International Search Report and Written Opinion for Application PCT/US2019/014139 filed on Jan. 18, 2019 dated May 4, 2019, International Searching Authority, EP.

* cited by examiner

*Primary Examiner* — Ling Siu Choi
*Assistant Examiner* — Ronald Grinsted
(74) *Attorney, Agent, or Firm* — McDonald Hopkins LLC

(57) ABSTRACT

This invention relates to eco-friendly solutions and gels for making high strength ultra-high molecular weight polyolefin (UHMWPO) fibers, films, filters, membranes by solution and gel spinning techniques. This invention also makes soft, strong, oriented, and elastic fibers from styrenic block copolymers. The polymers are first dissolved or dispersed in a cyclic terpene. In some embodiments, the fibers are extruded or drawn from the solution or gel, and cooled to form a gel filament. In some embodiments, the fibers and films are soft and elastic by making the spinnable solution or gel from polyolefin and styrenic block copolymers or other elastomeric polymers in cyclic terpene. In some embodiments the fibers and films produced can be oriented by stretching or drawing in the gel state before and/or during and/or after removal of cyclic terpene.

16 Claims, No Drawings

GEL SPUN FIBERS AND METHOD OF MAKING

CROSS-REFERENCE TO RELATED APPLICATIONS

The present application claims priority to and the benefit of International Application PCT/US2019/014139, titled "GEL SPUN FIBERS AND METHOD OF MAKING," filed on Jan. 18, 2019, which claims the benefit of U.S. Provisional Application No. 62/619,879 entitled "GEL SPUN FIBERS AND METHOD OF MAKING," filed on Jan. 21, 2018, the entire disclosure of each of which is incorporated herein by reference.

BACKGROUND

Articles such as ropes, tennis strings, fishing nets, anti-ballistic shaped articles, battery separators, filters, and membranes are made from oriented polyolefin fiber. These fibers can be gel spun from ultra-high molecular weight polyolefin (UHMWPO), such as ultra-high molecular weight polyethylene (UHMWPE) by a gel spinning process using organic solvents such as decalin, tetralin, toluene, lower alkanes, paraffin oil, mineral oil, paraffin wax, and the like. Most commercial processes uses decalin or paraffin oil. There is a trend in the industry to move away from petroleum based solvents to eco-friendly solvents and processes. The production of highly oriented polyolefin filament may also require numerous processing steps, which can lead to added time and costs in producing the filaments. There is an interest in the industry to produce modified polyolefin fibers such as those which are very soft and elastic. Another interest in the industry is to make elastomeric fibers from polymers which do not form monofilament fibers from neat solutions of the polymer in a solvent. Such polymers include polyisoprene, polybutadiene, polyisobutylene, ethylene propylene rubber and the like. There is also an interest to produce nanofibers in which the fiber diameters are in the nanoscale (about 2 to 100 nanometers) and in the micron scale (about 0.1 to 10 microns). Current compositions and processes for forming gel spun fibers do not readily achieve these goals or standards.

SUMMARY

The present compositions and processes provide solutions to one or more of the issues associate with conventional compositions and processes for forming gel spun fibers. In one aspect, provided is an eco-friendly spinnable (fiberforming) composition (in the form of a solution, gel, and/or dispersion) for making high strength fibers comprising ultra-high molecular weight polyolefin such as, but not limited to, polyethylene, and elastic highly stretchable fibers comprising styrenic block polymers. The polymers can be dispersed or dissolved in a cyclic terpene. For forming the fibers, the compositions desirably contain at least about 0.001% ultra-high molecular weight polyolefin such as, but not limited to, UHMWPE. Some embodiments of the invention include making high strength fibers from ultra high molecular weight polyethylene by dissolving or dispersing the UHMWPE in a citrus peel extract, such as d-limonene.

In another aspect, provided is a process for forming a gel spun fiber. In one embodiment, the solution or gel of ultra high molecular weight polyolefin is drawn or extruded through an aperture to form a first fiber gel. The part of the solvent exuding out from the gel filament during cooling is then removed by leaching or evaporation to form a second gel, the second gel is then dried to form a third gel. The first or second or third gel, or a combination of two or three gels are then stretched to orient the polymer. The fibers produced can be continuous or staple. Nano size fibers can be produced also using an electrospin process. In some embodiments fiber forming solution and gels are produced from styrenated block copolymers and polyolefins. In some embodiments the polyolefin is ultra high molecular weight polyolefin. In some embodiments the polyolefin is UHMWPE. In some embodiments the composition comprises an antioxidant such as di-t-butyl-p-cresol and the like. The fibers can be oriented to improve the strength properties by stretching, with stretch ratios as high as 1:90 or higher.

In one aspect, the present compositions and process solve one or more of the current issues or problems in producing gel spun fibers by making a gel spinnable polyolefin composition comprising eco-friendly cyclic terpenes such as, but not limited to, citrus peel extract, cyclic natural terpenes such as citrus oil, d-limonene (CAS No. 5989-27-5), l-limonene or racemic dl-limonene, and the like. The present invention also makes it possible to form fibers from solutions which are not spinnable by adding very low levels of ultrahigh molecular weight polyolefin such as UHMWPE into the solution. D-limonene is widely used as a safe natural flavor and fragrance additive in perfumes, soaps, food, chewing gum and beverages. However, natural cyclic terpenes such as d-limonene have not been used in solution or gel spinning processes. Surprisingly, it has been found that these cyclic natural terpenes can be used to form a spinnable solution and gel with ultra high molecular weight polyolefin such as UHMWPE. It was also discovered that styrenic block copolymer containing polyolefin polymers can form fibers from these solutions and gels. These compositions surprisingly maintain a gel state for spinning fibers especially with UHMWPE.

Thus, in one aspect, the compositions and process provide an eco-friendly solution and gel for making high strength, ultra-high molecular weight polyolefin fibers and films by solution and gel spinning techniques. The polymers are first dissolved or dispersed in a cyclic terpene such as, but not limited to, d-limonene. The fibers are extruded or drawn from this solution or gel, and cooled to form a gel filament. A method involves furnishing a solution or gel comprising polyolefin dissolved or dispersed in cyclic terpenes in an amount sufficient to form a gel filament forming solution; extruding the solution or gel through an aperture to a selected length as desired for a particular purpose or application; cooling the solution downstream, drawing the fiber before and/or during and/or after partial or complete removal of the cyclic terpene by evaporation or leaching or a combination of both.

This invention also discloses improved compositions for high strength fibers and also for fibers which range in properties from low modulus, high elongation, soft and elastic, to high modulus and high strength such as those from UHMWPE. The fibers can be monofilament, multifilment yarn, tapes, staple fiber, nonwoven, and the like depending on the process of manufacture.

There is a need in the industry to go away from the toxic petroleum based solvents such as Toluene. There is also a need to produce new compositions of spinnable solutions and gels with improved properties The present invention solves one or more of the previously discussed issues with conventional compositions for gel spinning fibers by making fibers from solutions of styrenic block copolymer compositions in an eco-friendly cyclic natural terpene, such as from citrus peel extract or citrus oil, d-limonene (CAS No. 5989-27-5), l-limonene or racemic dl-limonene, etc. Surprisingly, it has been found that these cyclic natural terpenes can be used to form a spinnable gel with certain styrenic block copolymer compositions containing polyolefin polymers. The levels of UHMWPE required to form a spinnable gel is very low in the range of about 0.01 to about 5 wt % of the polymer composition, preferable less than about 1 wt % of the composition. These compositions surprisingly maintains a fiber spinnable gel or solution state at elevated temperatures.

In one aspect, provided is a filament forming composition comprising a polyolefin and a cyclic terpene which can be used to form fibers by gel spinning.

In one embodiment, the polyolefin is an ultra-high molecular weight polyolefin. In one embodiment, the ultra-high molecular weight polyolefin is ultra-high molecular weight polyethylene.

In one embodiment of the composition of any previous embodiment, the ultra-high molecular weight polyolefin has a molecular weight greater than 1000000 grams per mole and may be in the range, for example, of 1000000 to about 10000000 grams/mole, about 2000000 to about 8000000 grams/mole, or about 3000000 to about 6000000 grams/mole.

In one embodiment of the composition of any previous embodiment, the ultra-high molecular weight polyolefin is present in an amount of from about 0.001 wt. % to about 15 wt. % based on the weight of the composition, from about 0.005 wt. % to about 10 wt. % of the solution or gel, from about 0.01 wt. % to about 5 wt. %, or from about 0.1 wt. % to about 2 wt. % of the solution or gel.

In one embodiment of the composition of any previous embodiment, the composition comprises a rubbery material chosen from polyisoprene, polybutadiene, ethylene propylene rubber or a combination thereof and the formed fibers are crosslinked.

In one embodiment of the composition of any previous embodiment, the rubbery material is present in an amount of from about 0.01 wt. % to about 15 wt. % based on the weight of the composition, from about 0.1 weight percent to about 10 weight percent, from about 0.5 weight percent to about 7.5 weight percent, or from about 1 weight percent to about 5 weight percent.

In another aspect, provided is a filament forming composition comprising a styrenic block copolymer, a polyolefin, and a cyclic terpene which can be used to form fibers by gel spinning.

In one embodiment, the polyolefin is an ultra-high molecular weight polyolefin. In one embodiment, the polyolefin is ultra-high molecular weight polyethylene.

In one embodiment, the polyolefin is an ultra-high molecular weight polyolefin. In one embodiment, the ultra-high molecular weight polyolefin is ultra-high molecular weight polyethylene.

In one embodiment of the composition of any previous embodiment, the ultra-high molecular weight polyolefin has a weight average molecular weight ($M_w$) greater than 1000000 grams per mole and may be in the range, for example, of 1000000 to about 10000000 grams/mole, about 2000000 to about 8000000 grams/mole, or about 3000000 to about 6000000 grams/mole.

In one embodiment of the composition of any previous embodiment, the ultra-high molecular weight polyolefin is present in an amount of from about 0.001 wt. % to about 15 wt. % based on the weight of the composition, from about 0.005 wt. % to about 10 wt. % of the solution or gel, from about 0.01 wt. % to about 5 wt. %, or from about 0.1 wt. % to about 2 wt. % of the solution or gel.

In one embodiment of the composition of any previous embodiment, the styrenic block copolymer is saturated.

In one embodiment of the composition of any previous embodiment, composition comprises an oil or plasticizer, in addition to the styrenic block copolymer.

In one embodiment of the composition of any previous embodiment, the styrenic block copolymer is poly (styrene-b-ethylene/butylene-b-styrene).

In one embodiment of the composition of any previous embodiment, the styrenic block copolymer is present in an amount of from about 5 wt. % to about 50 wt. %, or from about 5 wt. % to about 25 wt. %

In another aspect, provided is a fiber formed from a composition according to any of the previous embodiments.

In still yet another aspect, provided is a method for preparation of a fiber comprising: furnishing a composition comprising a polyolefin dissolved or dispersed in a cyclic terpene in an amount sufficient to form a gel filament forming solution or gel; drawing the solution as a fiber or extruding the said solution or gel through an aperture to an indefinite length; cooling the solution or gel downstream, drawing the fiber before and/or during and/or after partial or complete removal of the cyclic terpene by evaporation or leaching or a combination of both.

In one embodiment, the polyolefin is an ultra-high molecular weight polyolefin. In one embodiment, the polyolefin is ultra-high molecular weight polyethylene.

In one embodiment of the method according to any previous embodiment, the composition comprises a styrenic block copolymer in addition to the polyolefin, in which the composition is chosen such that the fiber is soft stretchable, and elastic. In one embodiment, the styrenic block copolymer is saturated. In one embodiment, the styrenic block copolymer is poly (styrene-b-ethylene/butylene-b-styrene).

In one embodiment of the method according to any of the previous embodiments, the composition for furnishing a solution or gel comprises an oil or plasticizer compatible with the mid-block of the sytrenic block copolymer.

In one embodiment of the method according to any of the previous embodiments, the method does not form a filament forming solution or gel by adding ultra-high molecular weight polyolefin in cyclic terpenes.

DETAILED DESCRIPTION

Reference will now be made to exemplary embodiments, examples of which are illustrated herein. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Provided is an eco-friendly, spinnable (fiber forming) composition for making high strength fibers from ultra-high molecular weight polymers such as polyethylene, and elastic highly stretchable fibers from styrenic block polymers. The compositions can be in the form of solutions, gels, or dispersions. The fibers are made from fiber forming solutions or gels.

"Solution" refers to a polymer dissolved in a suitable solvent and forms a homogeneous liquid solution.

"Spinnable solution or gel" refers to a composition in the form of a solution or gel from which a stable gel fiber can be drawn using conventional gel spinning techniques.

"Styrenated block copolymer," hereafter designated as "SBC," refers to linear triblock (A-B-A type) or radial block or multi arm block copolymers of the (AB)n type where A is predominantly the hard high glass transition temperature (Tg) polystyrene segment and B is predominantly the low Tg rubbery or elastomeric segment. A is normally known as end blocks and B as mid blocks. The Tg of the mid block can be decreased by adding mid block compatible plasticizers or oils and the Tg of the end block can be increased by adding end block compatible high Tg resins or polymers. The end blocks may have a Tg of 70° C. or above. In embodiments, the end blocks have a Tg of from 70° C. to about 170° C., about 80° C. to about 150° C., or from about 100° C. to about 120° C. The mid blocks may have a Tg of −10° C. or lower. In embodiments, the mid blocks have a Tg of from about −10° C. to about −100° C., about −20° C. to about −50° C., or from about −30° C. to about −40° C. If the elastomeric segment is polybutadiene, the SBC linear triblock is named poly(styrene-b-butadiene-b-styrene) or SBS for short, and if the elastomeric mid-block is polyisoprene, then this SBC linear triblock is named poly(styrene-b-isoprene-b-styrene) or SIS for short. The mid-block is unsaturated in SBS or SIS. The elastomeric mid-block can be saturated as in poly(styrene-b-ethylene/butylene-b-styrene) hereafter designated SEBS, poly(styrene-ethylene/propylene-styrene), hereafter designated SEPS, poly(styrene-b-ethylene/ethylene-b-styrene), hereafter designated SEES. These are also known as saturated SBCs or hydrogenated SBCs. SBCs is also include functionalized mid or end blocks. SBCs differ in molecular weight, end block content, diblock content, saturation, functionality etc. Various grades are available under the trade name Kraton from Kraton Polymers, and Septon and Hybrar from Kuraray. In making soft low modulus elastic fibers, it is preferred that the phase volume of the hard segment in the final article composition is below about 20% by volume. The SBC's can have end block or hard segment phase volume greater than 20%, but can be reduced to below by adding oils or polyolefin or polyolefin and oils, or other mid-block compatible extenders to bring it below 20% by volume. The block copolymers may be partially tapered or untapered. The term "tapered" means that the B block changes gradually from rubbery rich homopolymer sequence to include increasing amounts of hard A segments in a gradual conversion at the junction to hard A homopolymer end block. The block copolymers can be a radial or star block copolymer.

As used herein, the term "cyclic terpene" refers to a compound having an isoprene group and a saturated or unsaturated six-member carbon ring. Examples of sutiable cyclic terpenes include, but are not limited to, d-limonene, l-limonene, racemic dl-limonene, limonene, dipentene, pinene, alpha-pinene, beta-pinene, mixtures of alpha- and beta-pinene, carene, delta-3-carene, etc. The cyclic terpene may be either a naturally sourced or synthetically produced material. In embodiments, the cyclic terpene may be naturally sourced such as from citrus peels (e.g., from oranges, lemons, etc.).

"Polyolefin" refers to a polymer produced from an olefin monomer. Examples of suitable polyolefins include, but are not limited to, polyethylene, polypropylene, ethylene copolymers, propylene copolymers, butylene copolymers, and hexene copolymers. More specific examples include, but are not limited to, linear low density polyethylene (LLDPE) (0.915-0.925 g/cubic centimeter), ultra-high molecular weight polyethylene, low density polyethylene(0.910-0.940 g/cubic centimeter), high density polyethylene (>0.941 g/cubic centimeter), polypropylene, polypropylene/ethylene copolymers and the like. The copolymers can be partially or highly crystalline and include without limitation polyolefins made using metallocene catalysts. Blends of two or more polyolefins may be used. Many such polyolefins are supplied by Dow and Exxon/Mobil Chemical Companies. The polyolefin should form a liquid solution in a cyclic terpene at above ambient temperature, preferably above about 70° C. and preferably below the boiling point of the cyclic terpene.

Polyolefins may also include or be selected from "ultra-high molecular weight polyolefins." Ultra-high molecular weight polyolefins include, but are not limited to, linear or branched polyolefins having a molecular weight and/or viscosity much larger than conventional polyolefins. In embodiments, the ultra-high molecular weight polyolefins are predominantly linear polyolefins. Suitable ultra-high molecular weight polyolefins which can be used in the present invention include those having an intrinsic viscosity [η] of at least 5 dl/g, preferably 5 to 40 dl/g, 10 to 30 dl/g, or 15 to 20 dl/g as measured in decalin solvent at 135° C. The ultra-high molecular weight polyolefin may have, in embodiments, a weight average molecular weight ($M_w$) greater than 1000000 grams per mole and may be in the range, for example, of 1000000 to about 10000000 grams/mole, about 2000000 to about 8000000 grams/mole, or about 3000000 to about 6000000 grams/mole. Molecular weight may be determined by any suitable method. ASTM D 4020 from Intrinsic viscosity or by ISO 1628-3. One can also determine this from the Viscosity number such as normally used by Celanese using the Margolies equation. It is Applicant's understanding that there is no significant difference between the values determined by the different methods when the final numbers are computed.

Suitable ultra-high molecular weight polyolefins useful in the present compositions include, but are not limited to, homopolymers or copolymers of α-olefins such as ethylene, propylene, 1-butene, 1-pentene, 1-hexene, 1-octene, 1-decene, 1-dodecene, 4-methyl-1-pentene and 3-methyl-1-pentene. Of these, ultra-high molecular weight polyethylene (UHMWPE) are particularly suitable. UHMWPE refers to homopolymers of polyethylene or copolymers of polyethylene and one or more other olefins comprising a major portion of the ethylene and a minor portion of one or more other α-olefins. In on embodiment, the ultra-high molecular weight polyolefin is supplied as a powder from about 30 microns to about 200 microns. Ultra-high molecular weight polyethylene is currently used in orthopedic implants, filtration, batteries, high strength fibers, and membranes. UHMWPE is supplied by Celanese under the trade name GUR UHMW-PE in many grades for different applications.

"Ambient temperature" refers to room temperature, or from about 10° C. to about 40° C.

The compositions provide a composition suitable for forming fibers. The compositions comprise an ultra high molecular weight polyolefin, such as but not limited to ultra high molecular weight polyolefin, and a cyclic terpene, such as but not limited to d-limonene, suitable to form a spinnable gel. In embodiments, the ultra high molecular weight polyolefin is from about 0.001% to about 15 wt. % of the solution or gel, from about 0.005 wt. % to about 10 wt. % of the solution or gel, from about 0.01 wt. % to about 5 wt. %, or from about 0.1 wt. % to about 2 wt. % of the solution or gel.

The ultra high molecular weight polyolefin forms a spinnable gel at above about 110° C. and below about 175° C. in cyclic terpene such as d-limonene. The temperature range depends on the molecular weight of the ultra high molecular weight polyolefin and the concentration of ultra high molecular weight polyolefin in cyclic terpene. If the temperatures are too high, the filaments rupture during drawing. If the temperatures are too low, the filaments do not form easily due to high gel viscosity and elasticity. On cooling, the cyclic terpene exudes out from the gel which facilitate easy removal of cyclic terpene.

In some embodiments the ultra high molecular weight polyolefin in cyclic terpene is used to make a monofilament of indefinite length. As used herein, the term "indefinite length" means that the length of the filament be drawn or made is not limited except to the extent of the solution available to form the solution and that the filament can be made of any length as desired by the user for a particular purpose or intended application.

In some embodiments the ultra-high molecular weight polyolefin in a cyclic terpene is used to make staple fibers.

In some embodiments the ultra-high molecular weight polyolefin in a cyclic terpene is used to make nanofibers to make, for example, battery separators, filters, and membranes.

In some embodiments the ultra high molecular weight polyolefin in cyclic terpenes blended with styrenic block copolymers to form soft, low modulus, highly elastic fibers. The level of ultra high molecular weight polyolefin are desirably kept low compared to the levels of SBC to make high elongation, soft, and elastic fibers.

In some embodiments the SBC is unsaturated.

In some embodiments the SBC's can be saturated such as SEBS or SEPS.

In some embodiments the saturated SBC's contain a mid-block compatible oil in addition to cyclic terpenes.

In some embodiments the spinnable solution or gel is made from a thermoplastic gel comprising one or more SBCs, polyolefin, and a cyclic terpene or mixture of cyclic terpenes. In some embodiments the spinnable solution or gel is made from a thermoplastic gel formed from components comprising one or more saturated SBC's, oil, and polyolefin. In some embodiments the spinnable solution or gel is made from a thermoplastic gel comprising SEBS, oil, and polyolefin.

In some embodiments the polyolefin is ultra-high molecular weight. In some embodiments the polyolefin is ultra high molecular weight polyethylene.

In some embodiments the fibers and films produced can be oriented by stretching or drawing in the gel state before and/or during and/or after removal of cyclic terpene.

The SBCs surprisingly dissolve readily in cyclic terpenes by agitation at ambient temperature. The extenders, such as oil, can be added into this solution if desired and mixed thoroughly. The polyolefin can be initially soaked or agitated and then heated to about 110 to 175° C. to form a solution or gel in the cyclic terpene. In one embodiment, the polyolefin is in a powder form with dimensions of from about 10 microns to about 300 microns. Some polyolefins form a thermoplastic gel when cooled. Some polyolefins such as ultra-high molecular weight polyethylene forms a gel in cyclic terpene. This can be added if desired to the SBC solution in cyclic terpene and heated and homogenously mixed. The polyolefin can also be blended with the SBCs and then dissolved or form a spinnable gel in cyclic terpene by heating. Surprisingly, the SBCs and ultra-high molecular weight polyolefin in cyclic terpene, such as but not limited to d-limonene or citrus oil, forms a spinnable solution or gel even at very low levels of ultra-high molecular weight polyolefin. Only very low concentration of ultra-high molecular weight polyolefin is needed to convert an SBC solution in cyclic terpene to a spinnable gel. The SBC content in the solution can be from 5% to about 50% depending on the temperature, preferably from about 5% to about 25%. Polyolefin can be made into a solution or gel in hot cyclic terpene from about 0.001% to about 25%, preferably from about 0.01% to 15% depending on the grade and type of polyolefin. The solid content (SBC, polyolefin, oil) in the composition is controlled so that the solution in cyclic terpene forms a spinnable solution or gel.

In some embodiments the spinnable gel composition comprises a rubbery type polymer. Examples of suitable rubbery type materials include, but are not limited to, polyisoprene (IR), ethylene propylene rubbers such as EPM or EPDM, Polybutadiene (BR) such as syndiotactic 1,2-polybutadiene such as the JSR RB series of rubbers produced by Japan Synthetic Rubber Company in addition to the UHMWPE. The rubbery type materials can be dissolved in cyclic terpene from about 0.01 weight percent to about 15 weight percent of the solution, from about 0.1 weight percent to about 10 weight percent, from about 0.5 weight percent to about 7.5 weight percent, or from about 1 weight percent to about 5 weight percent. These compositions can be formulated with curing agents such as peroxides to be thermally crosslined or formulated with photoinitiators and UV crosslinked. These compositions can also be crosslinked by electron beam.

The composition may include other additives as desired for a particular purpose or intended application. Suitable additives include, but are not limited to, reinforcing fillers, colorants (e.g., pigments, dyes, etc.), brighteners, antioxidants, antiozonants, UV stabilizers, biocides, fragrances, flavoring, etc. Reinforcing fillers and inert diluent fillers may be employed in proportions up to about 25% by weight of the polymer. Such fillers, which may include carbon black, silica, and the like, as those of ordinary skill in the art will readily apprehend, can result in material improvement and enhancement of some of the physical properties of the thermoplastic polyurethane elastomers. In some embodiments the composition comprises crosslinking agents and/or photo initiators and the formed fibers are crosslinked by thermal, UV or electron beam.

Pigments, dyes, lakes, opacifiers, optical brighteners, and the like may also be employed to provide a wide range of colors and other optical properties. Titanium dioxide, zinc oxide, and other particulate optical ingredients can be dispersed in the solution in suitable amounts. Soluble materials in the solvent system can be dissolved in suitable amounts. Such components can be present in the solution at levels of up to as much as about 5% by weight of polymer in the solution.

When required, radiopaque pigments, such as lead particles, lead oxide, barium sulfate, bismuth subcarbonate, bismuth trioxide, bismuth oxychloride, and the like can be formulated into the articles by inclusion in the composition. Such radiopaque pigments make the molded articles detectable by X-Ray, and in higher proportions provide at least partial shielding to protect the user of the article. Full protection and shielding from X-Ray exposure will generally require additional protective measures however, as the shielding afforded in the present invention will generally be only partial.

Antioxidants and ultraviolet stabilizers are frequently desirable additions to the formulations, as such ingredients can serve to substantially extend the service and shelf life of fibers formed from the compositions.

Suitable biocides, biostats, flavors, fragrances and deodorants for use in the thermoplastic polyurethane elastomers may also be included in minor amounts, typically up to about 2% by weight of the polymer.

The fibers can be made in any of the known gel spinning techniques such as the steps of: furnishing a solution or gel comprising polyolefin dissolved or dispersed in cyclic terpenes in an amount sufficient to form gel filament forming solution; extruding the said solution or gel through an aperture to an indefinite length; cooling the solution downstream, drawing the fiber before, during and/or after partial or complete removal of the cyclic terpene by evaporation or leaching or a combination of both. Similar gel spinning technique can be used to make soft elastic fibers from styrenic block copolymers by using a solution or gel comprising styrenic block copolymer, polyolefin in cyclic terpene. Above processes can also be used for other polymers that does not form a filament forming solution or gel in cyclic terpene by adding UHMWPO in cyclic terpene and converting it into a filament forming solution or gel.

EXAMPLES

Example 1

0.4 grams of ultra-high molecular weight polyethylene powder from Sigma Aldrich having a molecular weight of 3,000,000-6,000,000 is dispersed in 100 grams of d-limonene. This dispersion is heated above 130° C. until a clear spinnable gel was produced. Fibers drawn from this gel showed a diameter of 5 microns.

Example 2

A 100 grams of SEBS polymer Septon 8004 from Kuraray America Inc., and 86 grams of Drakeol 7 from Penreco in 670 grams of d-limonene was prepared by agitation at ambient temperature (Solution A). An ultra-high molecular weight polyethylene dispersion is prepared by mixing 0.26 grams of Ultra high molecular weight polyethylene in 66 grams of d-limonene (Dispersion B). Dispersion B is heated to above 130° C. until the polyethylene is completely dissolved and form a spinnable gel. 15 grams of Solution A is added to this solution and mixed. The blended solution is heated until a spinnable gel is produced. Fibers drawn from this gel produced a soft and elastic fiber with elongation greater than 800%.

The foregoing description identifies various, non-limiting embodiments of a composition suitable for forming a gel spun fiber, articles formed from such compositions, and methods of making articles using such compositions. Modifications may occur to those skilled in the art and to those who may make and use the invention. The disclosed embodiments are merely for illustrative purposes and not intended to limit the scope of the invention or the subject matter set forth in the claims.

What is claimed is:

1. A filament forming composition comprising a polyolefin and a cyclic terpene, wherein the polyolefin is an ultra-high molecular weight polyolefin and the ultra-high molecular polyolefin is present in an amount of from about 0.001 wt. % to about 15 wt. % based on the weight of the composition.

2. The composition of claim 1, in which the ultra-high molecular weight polyolefin is ultra-high molecular weight polyethylene.

3. The composition claim 1, further comprising a rubbery material chosen from polyisoprene, polybutadiene, ethylene propylene rubber or a combination thereof and the formed fibers are crosslinked.

4. The composition of claim 3, wherein the rubbery material is present in an amount of from about 0.01 wt. % to about 15 wt. % based on the weight of the composition.

5. A filament forming composition comprising a styrenic block copolymer, a polyolefin, and a cyclic terpene wherein the polyolefin is an ultra-high molecular weight polyolefin, and the ultra-high molecular weight polyolefin is present in an amount of from about 0.001 wt. % to about 15 wt. % based on the weight of the composition.

6. The composition of claim 5 in which the polyolefin is ultra-high molecular weight polyethylene.

7. The composition of claim 5, wherein the styrenic block copolymer is saturated.

8. The composition claim 5, in which the composition comprises an oil or plasticizer, in addition to the styrenic block copolymer.

9. The composition claim 5, wherein the styrenic block copolymer is poly (styrene-b-ethylene/butylene-b-styrene).

10. A fiber produced from the composition of claim 1.

11. A method for preparation of a fiber comprising:
furnishing a composition comprising an ultra-high molecular weight polyolefin dissolved or dispersed in a cyclic terpene, the ultra-high weight polyolefin being present in the cyclic terpene at an amount of from about 0.001 wt. % to about 15 wt. % based on the weight of the composition;
drawing the solution as a fiber or extruding the said solution or gel through an aperture to an indefinite length;
cooling the solution or gel downstream, drawing the fiber before and/or during and/or after partial or complete removal of the cyclic terpene by evaporation or leaching or a combination of both.

12. The method of claim 11 in which the ultra-high molecular weight polyolefin is ultra-high molecular weight polyethylene.

13. The method of claim of claim 11 in which the composition comprises a styrenic block copolymer in addition to the ultra-high molecular weight polyolefin.

14. The method of claim 13, wherein the styrenic block copolymer is saturated.

15. The method of claim 13, wherein the styrenic block copolymer is poly (styrene-b-ethylene/butylene-b-styrene).

16. The method of claim 11, wherein the composition for furnishing a solution or gel comprises an oil or plasticizer compatible with a mid-block segment of the sytrenic block copolymer.

* * * * *